Patented Dec. 19, 1944

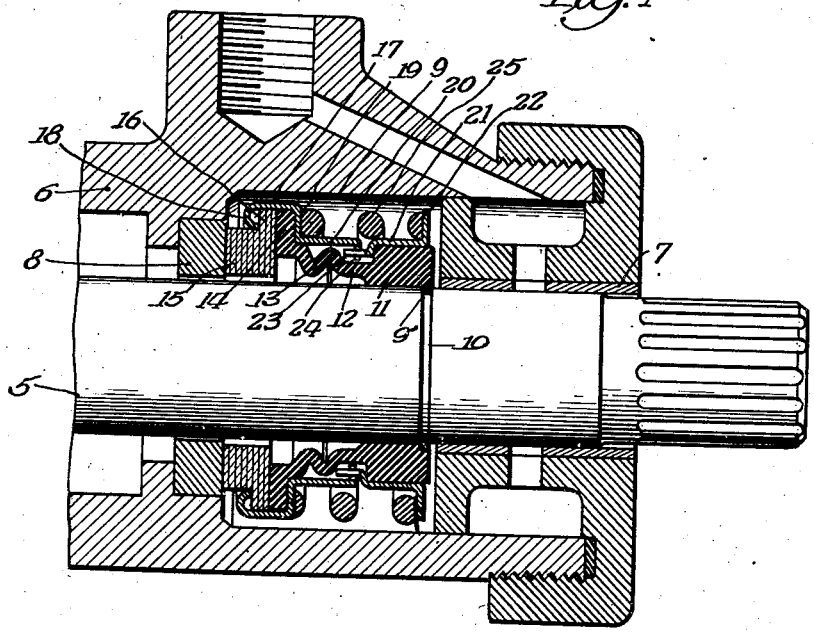

2,365,351

UNITED STATES PATENT OFFICE 2,365,351

FLUID SEAL

Albert J. Matter, Park Ridge, Ill., assignor to Crane Packing Company, Chicago, Ill., a corporation of Illinois Application July 26, 1943, Serial No. 496,097

4 Claims. (Cl. 286—11)

This invention relates in general to a fluid seal and is more particularly described as a shaft seal adapted to be preloaded upon a shaft at one end and to be driven thereby, and flexibly connected at the other end to a rotatable frictional sealing element.

An important object of the invention is to provide a sealing unit of the class described in which there is longitudinal yielding movement in the sealing element itself, having extensible positive driving connection between the ends of the sealing unit, and spring means for extending the driving means and the unit within the limits of its movement.

A further object of the invention is to provide a unitary sealing unit which fits closely around a shaft to which it is applied and occupies a small space in a surrounding recess or container.

Other objects of the invention will appear in the specification and will be apparent from the accompanying dawing in which, Fig. 1 is a sectional view of a sealing unit in accordance with this invention as applied in sealing a shaft;

Fig. 2 is a partial sectional view of a modified form of close coupled sealing unit; and Fig. 3 is also a partial sectional view of a modified form of sealing unit of more elongated form.

There are various types of fluid sealing units in which rubber-like sealing members are used in connection with springs and frictional sealing members. In the present form, the sealing member is made of rubber or rubber-like sealing material which is tightly applied or preloaded at one end upon the shaft and makes a fluid-tight connection through a frictional driving member at the other end. With a seal of this type, it is desirable to provide a driving connection between the sealing member and the frictional element at the other end which is not only capable of limited movement, but is also pressed tightly in contact with the frictional sealing surface.

Referring now more particularly to the drawing, a portion of a shaft 5 for a pump or any other suitable mechanism is shown as mounted in a housing or casing 6, with a bearing sleeve 7 at its outer end, and a frictional contact ring 8 at the inner end of a recess 9 in which the seal is located.

The seal may be positioned by a ring 9' seated in a groove 10, as shown in Fig. 1, or it may abut a shoulder 11 as shown in Fig. 2. Between the shoulder or contact ring and the frictional contact ring 8 is a predetermined space within which a seal is located to surround the shaft to engage the frictional contact ring and to be contained in the recess 9.

As shown in Fig. 1, a sealing member of rubber or rubber-like material has an end flange or ring 11 slightly smaller in diameter than the shaft to which it is applied so that it must be pressed tightly or preloaded thereon to make a fluid-tight joint with the shaft which is finished smoothly to fit it. Extending from the flange is a reduced portion 12 connected by one or more bellows folds 13 with an integral end flange 14 at right angles to the flange 11.

The outer end face of the flange 14 abuts the inside face of a frictional contact ring 15 usually formed of fibrous impregnated material which is adapted to make a ground or fluid-tight joint with the metal contact ring 8 which is secured to the casing 6 and does not make a fluid-tight joint with the shaft.

In order to secure the flange end 14 of the sealing member and the frictional member 15 together, the latter is formed with an outwardly projecting flange 16 and a metal ring 17 extends over the ends of the outsides of the two flanges with a curved extremity 18 bent over the flange 16 and a right angled bend 19 abutting the opposite outer face of the flange 14, the remainder 20 of the sleeve extending parallel around the shaft and outside of the bellows folds 13.

Surrounding the preloaded flange 11 is a sleeve member 21 to hold the flange tightly in place with an outwardly projecting rim 22 at one end and a reduced notched portion 23 at the other end adapted to engage correspondingly in turned and notched extremities 24 of the sleeve portion 20. This loosely notched connection permits the sleeve sections to move relatively with respect to the bellows portion of the sealing member within the limits of movement of the shaft and still to maintain the driving connection between these sleeve sections.

Surrounding the sleeve sections and contained in the space between the shoulder portion 19 of one sleeve member and the outwardly projecting rim of the other member is a spring 25 which yieldingly presses the sleeve sections apart, holds the ends of the sealing member against the ring 9 (or shoulder 11) and the frictional sealing member 15, and holds the sealing member against the frictional sealing ring 8 to maintain a fluid-tight connection.

In this construction, the driving connection is through the flange 11 of the sealing member to the surrounding sleeve member 21 and thence through the extensible connection with the other sleeve member 17 and thence to the other flanged end 14 of the sealing member and the frictional sealing ring 15 which are held together by the engagement of the bent extremity 18 and by the expansive action of the spring 25.

In the form shown in Fig. 2, the sealing member has a preloaded and relatively thick end portion 30, a connecting bellows portion 31, and an inner end portion 32 with a shouldered extremity 33 held outwardly from the shaft by an inner ring 34 and the extremity engaging within a shoulder 35 at the inner edge of a frictional sealing disk 36 which is positioned relatively outside of the sealing member. The inner end of this frictional sealing member forms a contact surface 37 for one extremity of an expansion spring 38, the other end of which engages an outwardly projecting flange 39 of a sealing ring 40 which has an inner flange 41 at the inner end of the flange portion 30.

The driving connection between the flange 30 of the sealing member and the frictional sealing member 36 is through the ring 40 and the spring 38 in contact therewith.

In the form shown in Fig. 3, a resilient and flexible sealing member has a sleeve portion 50 to fit tightly in preloaded condition upon a shaft with a bellows portion 51 extending therefrom and terminating in a flange 52 extending at right angles to the sleeve. This flange abuts one surface of a frictional contact ring 53 which engages a sealing surface 54.

The outer edge of the contact ring has notches 55 for engaging corresponding extremities 56 of a retaining sleeve 57 having an intermediate shoulder 58 for holding the flange 52 in contact with the sealing ring member 53 and the other extremity of the sleeve having notches 59 extending over the sleeve portion 50.

Seating the sleeve portion 50 against a shaft is a confining ring 60 having a notched flange 61 at one end for engaging corresponding notches of the sleeve member 57 and having a flange portion 62 at the other end so that a spring 63 may be disposed between it and the extremities of the sleeve 57 which project through the flange 61 at the other end. At the outer end of the sealing member and abutting the flange extremity 62 is a frictional contact member 64 which may be interposed between the flange and the shoulder 11 of a shaft, or if desired, this frictional contact member may be omitted.

The driving connection in this seal is through the preloaded section and the confining ring 60 to the sleeve 57 and the frictional contact ring 53, the bellows portion permitting the flexible elongation of the seal and this longitudinal movement being taken up directly by the spring assisting or in conjunction with the natural resilience of the sealing member itself.

In all of the forms, the sealing member is preloaded upon the shaft at one end and the driving connection is not through the sealing member, but is externally thereof with a movable connection between the preloaded end and the frictional sealing end, one of the connections as in Fig. 2 being a flexible driving connection, but the other two being positive, but expansible mechanical driving connections.

I claim:

1. In a fluid sealing device, a flexible and resilient sealing member adapted to be preloaded upon a shaft at one end and having its other end separated therefrom by flexible and resilient folds, a frictional contact ring in engagement with the said other end, a confining ring extending around the preloaded end of the sealing member, a sleeve member connected to the frictional contact ring and extending adjacent the edge of the confining ring and longitudinal expansible driving connection between the sleeve and the sealing ring.

2. In a fluid seal for shafts, a flexible and resilient sealing member having one end adapted to be preloaded upon a shaft and another end separated therefrom by integral resilient folds, a sealing ring applied over the preloaded end, a frictional contact ring abutting the other end of the sealing member, a sleeve connected to the frictional contact ring and extending adjacent the edge of the sealing ring, the sleeve and sealing ring having interengaging notched edges to form a driving connection with a limited longitudinal movement, and spring means interposed between the sleeve and the sealing ring tending to press them yieldingly apart.

3. In a fluid sealing unit for shafts, a flexible and resilient sealing member having one extremity of a size to be preloaded upon a shaft, and the other extremity integrally connected thereto by flexible and resilient folds, a frictional contact ring with which the other end is in contact, a sleeve member extending over the said other end and the adjacent edge of the contact ring, and abutting the inner face of the said other end, and a sealing ring applied over the preloaded end of the sealing member and having an outwardly extending flange, the adjacent edges of the sleeve and sealing ring having interengaging portions which permit their limited longitudinal movement, and a spring disposed between the flange of the sealing ring and the contact portion of the sleeve to press the other end of the sealing member against the frictional contact ring and tending to separate the sleeve and the sealing ring.

4. A fluid sealing unit comprising a flexible and resilient member having one end adapted to be preloaded upon a shaft and another end with a flange portion at right angles and connected thereto by flexible and resilient folds, a frictional contact ring engaging the said other end, a sealing ring for engaging the preloaded portion of the member, a sleeve for engaging the outer edge of the frictional contact member having an angular portion abutting the adjacent flanged extremity of the sealing member and extending over the flexible folds, the extremity of the sleeve engaging and extending beyond the extremity of the sealing ring for driving one or the other, and a spring interposed between the sealing ring and the projecting end of the sleeve for pressing the extremities of the sealing member apart and for holding the flanged extremity of the sealing member flexibly in contact with the frictional contact ring.

ALBERT J. MATTER.